March 31, 1964    N. L. CONGER ETAL    3,127,337
ANODIC PASSIVATION SYSTEM
Filed Jan. 7, 1960    2 Sheets-Sheet 1

INVENTORS
NORMAN L. CONGER
OLEN L. RIGGS JR.
BY
*William J. Miller*
ATTORNEY

March 31, 1964   N. L. CONGER ETAL   3,127,337
ANODIC PASSIVATION SYSTEM

Filed Jan. 7, 1960   2 Sheets-Sheet 2

INVENTORS
NORMAN L. CONGER
OLEN L. RIGGS JR.
BY
ATTORNEY

United States Patent Office 3,127,337
Patented Mar. 31, 1964

3,127,337
ANODIC PASSIVATION SYSTEM
Norman L. Conger, 939 N. 4th St., and Olen L. Riggs, Jr., 342 S. Oak, both of Ponca City, Okla.
Filed Jan. 7, 1960, Ser. No. 1,135
6 Claims. (Cl. 204—196)

This application is a continuation in part of copending application No. 798,026, filed March 9, 1959, now abandoned.

This invention relates to an improved system for anodically passivating a vessel containing a corrosive solution.

It has been known for several years that corrosion of a vessel which contains a corrosive solution may be minimized by inserting an inert electrode into the corrosive solution and applying a potential between the vessel wall and the inert electrode such that a current will flow from the vessel through the corrosive solution to the inert electrode. The vessel will corrode at a rate which is determined by comparing the difference in potenetial between the wall of the vessel and a standard electrode, such as a calomel cell which is in communication with the corrosive solution.

Prior anodic polarization systems have attempted to more or less continuously sample the difference in potential between the walls of the vessel and the standard electrode. This potential difference was then used to directly control the direct current potential being imposed between the walls of the vessel and the inert electrode. These prior systems are operabel and efficient when the anodic current demands are small, as in laboratory set-ups. However, in many commercial applications of an anodic passivation system, the anodic current demands are frequently in the range of several hundred amperes, therefore, the present state of development of the required instrumentation does not permit efficient control of such large currents. For example, previous systems have utilized either a device known as a potentiostat which uses vacuum tubes for continuously varying the anodic current, or a control system which uses a switch in the direct current circuit to provide an on and off type of control of the anodic current. Due to the nature of vacuum tubes, a practical limit is imposed on the potentiostat with respect to the maximum value of the anodic current which may be controlled.

When using an on and off type of control of the direct current potential, the mechanical switch imposed in the direct current circuit must, in many installations, operate at frequent intervals in order to obtain the desired control. Further at times the inherent inertia in a mechanical switch will cause the switch to be open when it should be closed. Under the foregoing conditions, prolonged operation will result in severe wear and ultimate failure of the switch. Furthermore, when large currents are interrupted, electric arcs are created between the contact surfaces of the mechanical switch. These arcs constittute a severe hazard in explosive environments.

One embodiment of the present invention contemplates a novel anodic polarization system wherein the necessity for varying the large polarization current is circumvented, even though large polarization currents may be required in the system in which the present invention is used. The present system may utilize either a permanent or a portable source of alternating current, but preferably utilizes a permanent source of alternating current having a high voltage and a low current, such as may be found in most industrial installations. We prefer to use the conventional 110–120 volt, 60 cycle line power. The present invention contemplates interposing a current regulating means of the continuous current type in the alternating current line, and adjusting the current regulating means in accordance with the potential between a standard electrode and the walls of a vessel containing a corrosive solution. With this combination, conventional equipment may be utilized to simplify the engineering design of a control system, and the polarizing current will be under control continuously to provide precise control of the rate of corrosion of the vessel. Furthermore, the present system requires only simple apparatus which may be easily obtained and installed.

Broadly stated, the present invention may be defined as a system for polarizing a vessel containing a corrosive solution, the combination of: a supply of alternating current, a rectifier connected to the alternating current supply for producing a direct current potential at the output terminals thereof, an electrode secured in the vessel in communication with the corrosive solution, means connecting the output terminals of the rectifier to said electrode and the vessel and passing an anodic polarizing current through the solution, a standard electrode connected electrochemically with the solution in the vessel, current regulating means of the continuous current type interposed in the connection of the alternating current supply to the rectifier, and control means connected across the standard electrode and the vessel.

An important object of this invention is to provide an efficient and economical system for passivating vessels containing corrosive solutions.

Another object of this invention is to use an alternating current power source in an anodic polarization system, and to control the current through control of the alternating current supply.

A further object of this invention is to control the polarizing current continuously in an anodic polarizaetion system with the use of a minimum amount of power.

A still further object of this invention is to provide a control system for the anodic passivation of vessels containing corrosive solutions which utilizes only conventional and simple apparatus which is simple to install and which will have a long service life.

Other objects and advantages of the invention will be evident from the following detailed description, when read in conjunction with the accompanying drawings which illustrate our invention.

Figure 1:
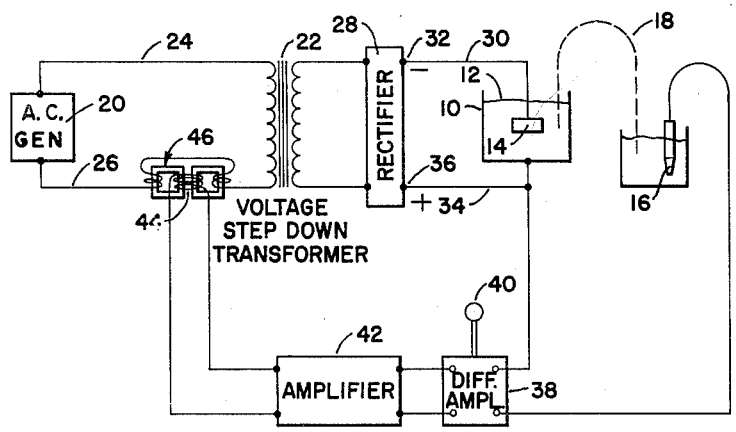
FIG. 1 is a schematic illustration of an anodic polarizaetion system utilizing a preferred form of this invention.

Referring to the drawings in detail, and particularly FIG. 1, reference character 10 designates a vessel containing a corrosive solution 12 and which is to be protected against the corrosive action of solution 12, which is electrolytic and may be either acidic or alkaline. Vessel 10 must be metallic and will ordinarily be constructed out of stainless steel since it is designed for use in a corrosive environment. Anodic polarizing current is passed through solution 12 between the walls of vessel 10 and an inert electrode 14 which may be supported in solution 12 in any suitable manner. Electrode 14 may be constructed out of any material which is inert to its environment and will normally be either platinum or carbon. The potential of vessel 10 is compared with the potential of a standard electrode 16 communicating electrochemically with solution 12 by means of a suitable electrolytic bridge 18. Standard electrode 16 may take any desired form, such as a calomel cell. Other suitable cells are by way of example a silver-silver chloride cell, a copper-copper sulphate cell or a hydrogen cell. Bridge 18 must be an ionic conductor and may be either a liquid, such as a KCL, or a solid, such as silver chloride.

As it is well known in the art, the rate of corrosion of the type being considered varies with the potential difference between vessel 10 and standard electrode 16. When vessel 10 is made the anode of an electrochemical cell, the potential of the vessel shifts in the more noble direction. When this shift is sufficient to build a highly resistive coating over the vessel, the corrosion stops and it is said that the vessel has become passive.

In accordance with the present invention, the anodic polarizing current between vessel 10 and inert electrode 14 is supplied by a source 20 of alternating current power. In the preferred embodiment, source 20 provides conventional 110/120 volt, 60-cycle power which is normally considered high voltage-low current power. This high voltage-low current A.C. power is supplied to the primary of a voltage step-down transformer 22 through a pair of conductors 24 and 26.

One conductor 30 connects a negative output terminal 32 of rectifier 28 to inert electrode 14, and another conductor 34 connects a positive output terminal 36 of rectifier 28 to vessel 10. It will thus be observed that the high voltage-low current A.C. power supplied by source 20 is converted to low voltage-high current D.C. power and is then imposed across the electrode 14 and vessel 10 to pass an anodic polarizing current through solution 12. It should be noted that electrode 14 is connected to rectifier 28 in such a manner that the electrode forms the cathode of an electrochemical cell such that a (current) passage is provided through solution 12 in the desired direction.

Any suitable control device 38 is connected across vessel 10 and standard electrode 16 which will monitor the difference in potential between vessel 10 and standard electrode 16 and produce an output signal proportional to this potential difference. In a preferred embodiment control device 38 comprises a differential or comparison amplifier of the type disclosed in a standard reference works— Electronic Designers Handbook by R. W. Landee, D. C. Davis, and A. P. Albrect (McGraw-Hill 1957) starting at page 3–61. Also a reference voltage is applied to differential amplifier 38 from a suitable source 40 to control the amount of potential difference between vessel 10 and standard electrode 16.

The signal produced by differential amplifier 38 is applied to a power amplifier 42, and the amplified signal is then applied to a direct current control winding 44 of a saturable core reactor 46 which is interposed in the conductor 26 between the alternating current supply 20 and transformer 22. Saturable core reactor 46 may be of any suitable type, such as is disclosed in Magnetic Amplifiers— Theory and Application by Platt (Prentiss), or Electronic Designers Handbook by R. W. Landee, D. C. Davis, and A. P. Albrect (McGraw-Hill 1957). As it is well known in the art, the amount of D.C. current flowing through control winding 44 controls the amount of A.C. current flowing through conductor 26. When no current is applied to control winding 44, a minimum current may pass through the conductor 26; however, when sufficient current is imposed on control winding 44 to saturate the core of the reactor 46, a maximum current may flow through conductor 26.

In operation of the system shown in FIG. 1, the source of alternating current 20 is energized and the reference voltage is applied to differential amplifier 38 by source 40. During the initial passivation of vessel 10, the potential difference between vessel 10 and the standard electrode 16 is usually large thereby resulting in a large output signal from the differential amplifier 38. This signal, as previously described, is applied to control winding 44 of saturable core reactor 46 to saturate the core of the reactor and supply the maximum alternating voltage across transformer 22. This high voltage-low current A.C. power is converted by transformer 22 to a low voltage-high current A.C. power. Rectifier 28 in turn converts this low voltage-high current A.C. power to low voltage-high current D.C. power which is applied between vessel 10 and the inert electrode 14 to pass anodic polarizing current through solution 12.

As vessel 10 becomes passivated, the potential of vessel 10 approaches the more noble potential of standard electrode 16, thus the difference in potentials fed to differential amplifier 38 is sufficient to produce only a minimum output signal from differential amplifier 38. As a result, a minimum signal is applied to the control winding 44 of saturable core reactor 46, and the alternating current supplied by source 20 to the transformer 22 is reduced to a level sufficient to maintain only the desired passivity. In the event the corrosion rate of vessel 10 again increases, as will invariably occur, the potential difference between vessel 10 and standard electrode 16 will be increased to activate differential amplifier 38. As previously indicated, the output signal of differential amplifier 38 is proportional to the potential difference between vessel 10 and standard electrode 16, such that the signal applied to control winding 44 of saturable core reactor 46 is proportional to the anodic polarizing current required for regaining the desired passivity of vessel 10. As a result, the corrosion of vessel 10 will be maintained at a minimum to extend the service life of the vessel and minimize the amount of iron entering solution 12 from the walls of the vessel.

Figure 2:
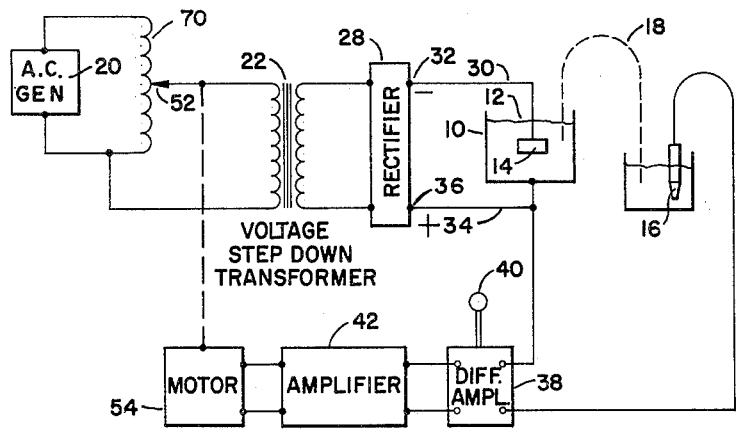
FIG. 2 is another schematic illustration, similar to FIG. 1, illustrating a modified anodic polarization system.

The modified anodic passivation system shown in FIG. 2 is the same as the system shown in FIG. 1, except for the means used to regulate the power supplied by source 20 to step-down transformer 22 in accordance with the output signal of the differential amplifier 38. In FIG. 2, an autotransformer 70 is interposed in the connection of source 20 to the transformer 22. A movable contact 52 of autotransformer 70 is mechanically connected to a motor 54 which is energized by differential amplifier 38 and power amplifier 42. It will thus be observed that motor 54 is operated in accordance with the output signal of differential amplifier 38, and motor 54 in turn controls the position of movable contact 52 on autotransformer 70 to regulate the amount of power supplied to the primary of transformer 22. A a result, the output signal of differential amplifier 38 controls the amount of power supplied to transformer 22, and the output of differential amplifier 38 is in turn controlled by the difference in potential between vessel 10 and standard electrode 16 in the same manner as previously described in connection with FIG. 1.

Figure 3:
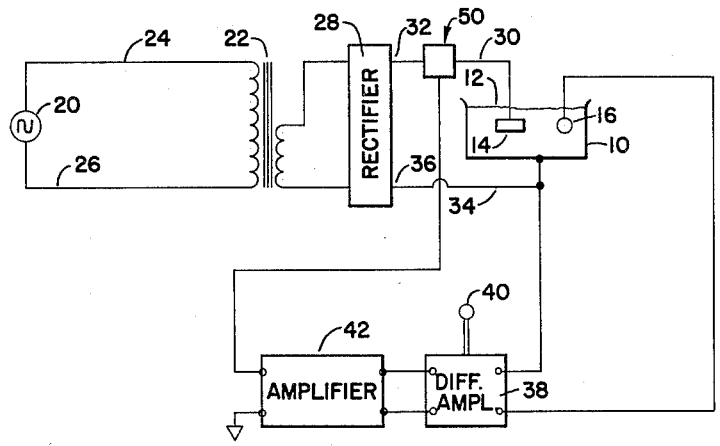
FIG. 3 is a schematic showing another embodiment of this invention.

Referring to FIG. 3, a third embodiment of this invention is shown wherein a controlling means 50 is inserted in conductor 30 by the rectifier 28 and inert electrode 14. Controller means 50 is operated by differential amplifier 38 and amplifier 42 in the manner of the embodiment shown in FIGS. 1 and 2.

Figure 4:
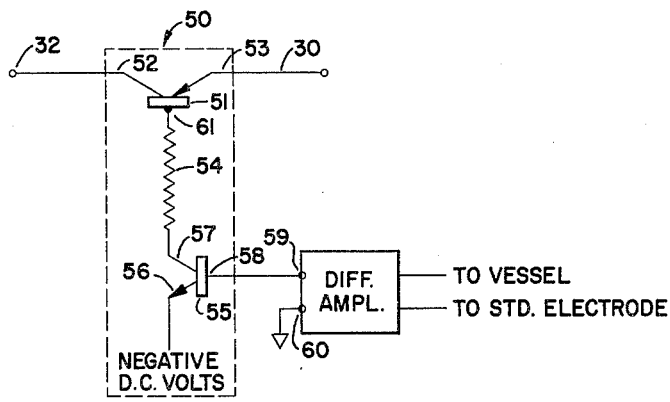
FIG. 4 is a schematic of a preferred current controller.

Controller means 50 is shown in FIG. 4 wherein a transistor 51 has its emitter connected to conductor 30, its collector 52 connected to rectifier 28, its junction 32 and its base connected to collector 57 of transistor 55 through a means which is resistor 54. Transistor 55 has its emitter 56 connected to a negative source of D.C. volts. Base 58 is connected to the output terminal 59 of the differential amplifier.

In operation the continuously proportional signal from the differential amplifier 38 is applied to base 58 of transistor 55. This continuously varying signal will cause the resistance between collector 57 and emitter 56 of transistor 55 to continuously vary in response to a change of current being applied to base 58. This change in current varies the potential at the base 61 of transistor 51 which likewise will vary the internal resistance between collector 52 and emitter 53 of transistor 51. This variation in collector to emitter resistance of transistor 51 will cause a corresponding variation in current at inert electrode 14. The variation in current being supplied to inert electrode 14 will be directly proportional to the signal from the differential amplifier 38.

It should be obvious to one skilled in the art that transistor 51 may be connected between the alternating current generator and the remote electrode 14, thus omitting the stepdown transformer shown in FIG. 1. Transistor 51, however, must be of the high voltage type which is capable of delivering a large amount of current if the transformer is to be replaced. Since the transistor is a semi-conduction device, current will flow in one direction only, therefore, the rectifier 28 would be unnecessary and may be eliminated also. It is further obvious that other forms may be substituted in place of transistor 51 such as the new type controllable diode rectifier. Other forms of rectifiers such as mercury pool rectifiers may be used.

From the foregoing it will be apparent that the present invention provides an economical and efficient system for anodically passivating a vessel containing a corrosive solution. The present system provides a signal proportional to the potentional difference between the vessel and a standard electrode, and this proportional signal is in turn used to regulate or adjust the amount of anodic current passed through the corrosive solution to passivate the vessel. Either a permanent or portable source of alternating current may be used, and the anodic current is controlled indirectly by regulating the power supplied by the alternating current source or directly by regulating the D.C. from the rectifiers. In the preferred embodiment, a high voltage-low current power is controlled to minimize the power requirements of the control system. It will be further apparent that the present system utilizes conventional and simple apparatus which will be easily installed and will have a long service life.

Changes may be made in the combination and arrangement of parts or elements as heretofore set forth in the specification and shown in the drawings, it being understood that changes may be made in the embodiments disclosed without departing from the spirit and scope of the invention as defined in the following claims.

We claim:

1. A system of anodically polarizing a vessel adopted to contain a corrosive solution, the combination of a source of electrical energy, a load connected across said source of energy, an electrode secured in the vessel in communication with the corrosive solution, a standard electrode communicating with the solution in the vessel, said load comprising the said electrode, the corrosive solution, and the vessel, said source of electrical energy being connected to said load such that said vessel will have a positive potential and said electrode will have a negative potential, current regulating means, said current regulating means connected in series with said load, a differential amplifier means having a first and second input, said standard electrode connected to said first input, said vessel connected to said second input, means connecting the output of said differential amplifier means to said current regulating means whereby variation in the potential between said first and second input results in corresponding change in potential at the output of said differential amplifier means, said output potential causing a proportional change in the resistance of said current regulating means thereby varying the current through the load.

2. A system as described in claim 1 further particularized in that said current regulating means comprises a transistor, the output of said differential amplifier means connected to the base of said transistor, and the collector and emitter of said transistor serially connected with the load whereby variations in potential at the base of said transistor will cause a variation in the emitter to collector resistance thereby varying the current to said load in proportion to the variation and voltage from said controller.

3. In a system for anodically polarizing a vessel adapted to contain a corrosive solution, the combination of: a supply of alternating current; a rectifier connected to the alternating current supply for producing a direct current potential at its output thereof; an electrode secured in the vessel in communication with the corrosive solution; means connecting the negative output terminal of the rectifier to said electrode and the positive output terminal of the rectifier to said vessel, said electrode and vessel being adapted to pass a current through the corrosive solution; a standard electrode in electro-chemical communication with the corrosive solution in the vessel; current regulating means interposed in the connection between the alternating current supply and the rectifier; a differential amplifier having one input connected to said standard electrode and having a second input connected to said vessel; a reference potential, said reference potential adapted to apply a potential to said differential amplifier to control the potential between said standard electrode and said vessel; means for connecting the output of said differential amplifier to said current regulating means for adjusting said current regulating means in accordance with the potential difference between the standard electrode and the vessel, and the said reference potential.

4. The system as defined in claim 3, wherein said current regulating means comprises a saturable core reactor having a direct current control winding, and said means for adjusting the current regulating means comprising an amplifier connected to said differential amplifier and said direct current control winding.

5. In a system for anodically polarizing a vessel adapted to contain a corrosive solution by use of a high voltage-low current alternating current power supply, the combination of: a step-down transformer for converting the high voltage-low current alternating current power to low voltage-high current alternating current power, a rectifier having positive and negative output terminals and an input connected to the step-down transformer for converting the low voltage-high current alternating current power to low voltage-high current direct current power, an electrode secured in the vessel in communication with the corrosive solution, means connecting the negative terminal of the rectifier to said electrode and means for connecting the positive terminal of said rectifier to the vessel for passing a current through the solution, a standard electrode connected electrochemically with the solution in the vessel, current regulating means interposed in the connection of the high voltage-low current alternating current power supply to the step-down transformer for controlling the alternating current supplied to the step-down transformer, a differential amplifier having a first input connected to said standard electrode, and having a second input connected to said vessel; a reference potential, said reference potential adapted to apply a potential to said differential amplifier to control the potential between said standard electrode and said vessel, means for connecting the output of said differential amplifier to said current regulating means for adjusting said current regulating means in accordance with the potential difference between the standard electrode and the vessel, and the said reference potential.

6. A system as defined in claim 5 wherein the current regulating means comprises a transistor interposed in said high voltage, low current A.C. power supply to the step-down transformer, and means connecting its base to said differential amplifier output.

References Cited in the file of this patent

UNITED STATES PATENTS

| | | |
|---|---|---|
| 2,402,494 | Hantzsch et al. | June 18, 1946 |
| 2,576,680 | Guitton | Nov. 27, 1951 |
| 2,759,887 | Miles | Aug. 21, 1956 |
| 2,803,797 | Cowles | Aug. 20, 1957 |
| 2,878,173 | Oberman | Mar. 17, 1959 |
| 2,886,496 | Ecksfeldt | May 12, 1959 |
| 2,918,420 | Sabins | Dec. 22, 1959 |
| 2,963,413 | Sabins | Dec. 9, 1960 |
| 2,982,714 | Sabins | May 2, 1961 |
| 2,986,512 | Sabins | May 30, 1961 |
| 3,009,865 | Mueller et al. | Nov. 21, 1961 |

OTHER REFERENCES

Power Engineering, volume 61, No. 1, January 1957, page 65.